US012584069B2

(12) United States Patent
Jones et al.

(10) Patent No.:  US 12,584,069 B2
(45) Date of Patent:       Mar. 24, 2026

(54) METHODS AND SYSTEMS FOR PRODUCING ENERGY FROM WASTE MATERIALS

(71) Applicant: W2E USA LLC, Blue Ash, OH (US)

(72) Inventors: Allan Jones, Milford, OH (US); Glenn Showers, Cincinnati, OH (US); Paul Aiken, Prestonsburg, KY (US)

(73) Assignee: W2E USA LLC, Blue Ash, OH (US)

( * ) Notice: Subject to any disclaimer, the term of this patent is extended or adjusted under 35 U.S.C. 154(b) by 61 days.

(21) Appl. No.: 17/517,275

(22) Filed: Nov. 2, 2021

(65) Prior Publication Data

US 2022/0135883 A1      May 5, 2022

Related U.S. Application Data

(60) Provisional application No. 63/108,695, filed on Nov. 2, 2020.

(51) Int. Cl.
*C10J 3/00*          (2006.01)
*B09B 3/40*          (2022.01)
(Continued)

(52) U.S. Cl.
CPC ................ *C10B 21/12* (2013.01); *B09B 3/40* (2022.01); *C01B 3/02* (2013.01); *C10B 49/16* (2013.01);
(Continued)

(58) Field of Classification Search
CPC ........... C10B 1/10; C10B 47/30; C10B 49/16; C10B 57/02; C10B 53/00; C10B 53/02;
(Continued)

(56) References Cited

U.S. PATENT DOCUMENTS 4,374,650 A  *  2/1983  Garside ...................... C10J 3/06
                                                     48/202
5,423,891 A  *  6/1995  Taylor ...................... C10J 3/005
                                                     48/209
(Continued)

OTHER PUBLICATIONS

U.S. Appl. No. 63/008,902, Corresponds to DeBruin et al. (US 2023/0235238), filed Apr. 21, 2020.*
(Continued)

*Primary Examiner* — Jonathan Luke Pilcher

(74) *Attorney, Agent, or Firm* — Dinsmore & Shohl LLP

(57) ABSTRACT

A system for processing solid waste including a segmented gasifier having a first segment detachably connected to a second segment, and a burner positioned downstream of the segmented gasifier and coupled to the segmented gasifier. A process for treating solid waste including introducing the solid waste into a first end of a segmented gasifier having a first segment detachably connected to a second segment. Gasifying the solid waste as it traverses from the first end of the gasifier to a second end of the segmented gasifier, and producing a gaseous output and a solid output at the second end of the segmented gasifier. Separating the gaseous output and the solid output, and introducing a portion of the gaseous output to a burner and recycling a portion of the gaseous output to the segmented gasifier as an energy source.

15 Claims, 2 Drawing Sheets

(51) Int. Cl.

| | |
|---|---|
| *C01B 3/02* | (2006.01) |
| *C10B 21/12* | (2006.01) |
| *C10B 49/16* | (2006.01) |
| *C10B 53/00* | (2006.01) |
| *C10B 53/02* | (2006.01) |
| *C10B 53/07* | (2006.01) |
| *C10B 57/02* | (2006.01) |
| *C10J 3/84* | (2006.01) |
| *B09B 101/75* | (2022.01) |
| *B09B 101/85* | (2022.01) |
| *C10B 1/10* | (2006.01) |

(52) U.S. Cl.

CPC .............. *C10B 53/00* (2013.01); *C10B 53/02* (2013.01); *C10B 53/07* (2013.01); *C10B 57/02* (2013.01); *C10J 3/005* (2013.01); *C10J 3/84* (2013.01); *B09B 2101/75* (2022.01); *B09B 2101/85* (2022.01); *C10B 1/10* (2013.01); *C10J 2300/092* (2013.01); *C10J 2300/0946* (2013.01); *C10J 2300/0983* (2013.01); *C10J 2300/1215* (2013.01); *C10J 2300/1223* (2013.01); *C10J 2300/1606* (2013.01); *C10J 2300/1637* (2013.01); *C10J 2300/1823* (2013.01)

(58) Field of Classification Search

CPC .. C10B 53/07; C10J 3/002; C10J 3/005; C10J 3/721

See application file for complete search history.

(56)     References Cited

U.S. PATENT DOCUMENTS

| | | | | | |
|---|---|---|---|---|---|
| 5,425,792 | A | * | 6/1995 | Bishop | ................... C10K 1/026 |
| | | | | | 75/505 |
| 5,944,960 | A | * | 8/1999 | Nakata | ...................... C10B 1/10 |
| | | | | | 432/106 |
| 9,994,774 | B2 | * | 6/2018 | Li | ........................... C10B 47/30 |
| 2022/0258218 | A1 | * | 8/2022 | Ryan | ......................... B09B 3/45 |
| 2023/0235238 | A1 | * | 7/2023 | DeBruin | ................ B29B 17/04 |
| | | | | | 252/373 |

OTHER PUBLICATIONS

"Process Description", EnviropPower Renewable Inc., 2019, https://eprenewable.com/our-process/.*

* cited by examiner

METHODS AND SYSTEMS FOR PRODUCING ENERGY FROM WASTE MATERIALS

CROSS-REFERENCE TO RELATED APPLICATION

This application claims the benefit of priority under 35 U.S.C. § 119 of U.S. Provisional Application Ser. No. 63/108,695 filed on Nov. 2, 2020, the content of which is relied upon and incorporated herein by reference in its entirety.

FIELD

The present specification generally relates to methods and systems for producing energy from waste materials and, more specifically, to methods and systems for producing energy from a low input of waste materials.

TECHNICAL BACKGROUND

The world depends on energy to maintain everything from creature comfort to safety and security. The availability and environmental impact of obtaining needed energy is becoming more problematic, and the cost of producing and shipping resources needed to produce energy is costly. Nevertheless, a massive source of potential energy is landfilled around the world every day as solid waste. Not only is this an underutilized resource, but landfilling causes numerous problems and has limited capacity.

Municipal solid waste is commonly incinerated in a combustion process at 1600 degrees Fahrenheit (° F.). This incineration process destroys waste by burning it, usually at high temperatures with excess air. The ultimate purpose of the process is to burn as much waste as possible and as quickly as possible. One potential problem with such incineration is that the emissions of the incinerator may contain toxic and other unwanted pollutants dangerous to human health and the environment. Another potential problem with conventional incineration is that the process destroys all the municipal solid waste (MSW) and does not recycle any of it.

Accordingly, a need exists for a relatively inexpensive energy source that relies on existing materials, behaviors, and practices to produce accessible and reliable energy. Existing renewable fuel sources are not reliable as they depend on weather conditions. Fossil fuels have a limited supply and numerous environmental impacts. Nuclear power is costly, and disposal of spent fuel is a significant issue. In view of present conditions, systems and process are needed that can transform readily available resources into an inexpensive and easily accessible energy source.

SUMMARY

According to a first aspect, a system for processing solid waste comprises: a segmented gasifier comprising a first segment detachably connected to a second segment; and a burner positioned downstream of the segmented gasifier and coupled to the segmented gasifier.

A second aspect includes, a process for treating solid waste comprising: introducing the solid waste into a first end of a segmented gasifier comprising a first segment detachably connected to a second segment; gasifying the solid waste as it traverses from the first end of the gasifier to a second end of the segmented gasifier; producing a gaseous output and a solid output at the second end of the segmented gasifier; separating the gaseous output and the solid output; and introducing a portion of the gaseous output to a burner and recycling a portion of the gaseous output to the segmented gasifier as an energy source.

Additional features and advantages will be set forth in the detailed description that follows, and in part will be readily apparent to those skilled in the art from that description or recognized by practicing the embodiments described herein, including the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
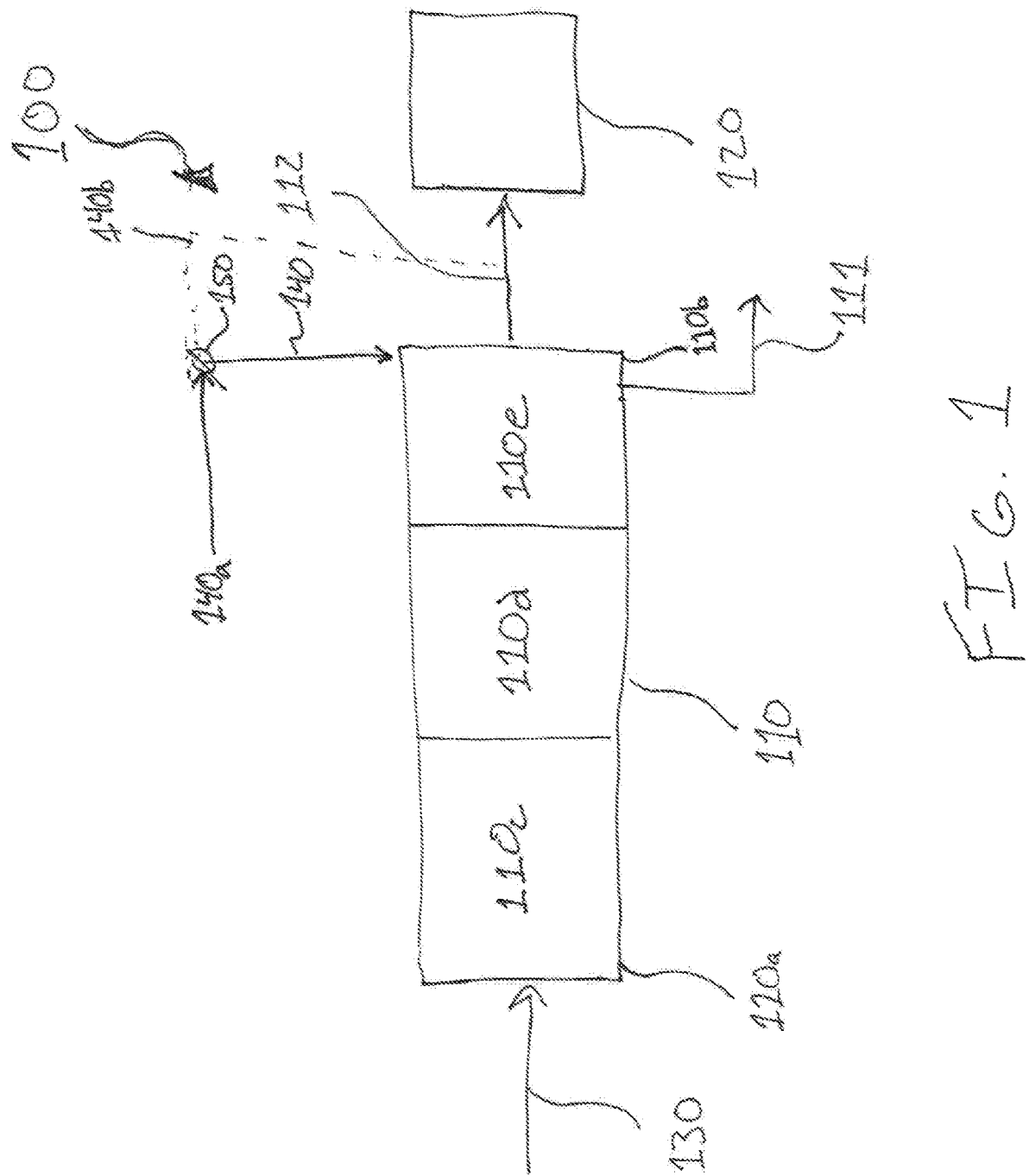
FIG. 1 is a schematic drawing of a system for producing energy from waste materials according to embodiments disclosed and described herein.

Global population is expected to increase to 9.7 billion people by 2050. The demand for energy is expected to double in the next 30 years. Landfill space is at a premium and many landfills are nearing capacity. It is projected that by the next five years 15% of existing space in landfills will be unavailable. This means that by 2021 only 15 years of landfill capacity will remain. Incineration is expensive, produces ash that must be landfilled separately, and has significant environmental effects.

Gasification is a process that converts organic or fossil fuel carbonaceous materials into carbon monoxide, hydrogen, and carbon dioxide (also referred to as syngas). This is achieved by reacting the material at high temperatures (such as greater than 700° C.) without combustion and with a controlled amount of oxygen and/or steam. The resulting gas mixture is called syngas (from synthesis gas) or producer gas and is itself a fuel. The power derived from gasification and combustion of the resultant gas is considered a source of renewable energy if the gasified compounds were obtained from biomass. Accordingly, gasification is a good option for both reducing MSW that goes to landfills as well as producing energy from MSW, which has both economic and environmental benefits.

Gasification generates its own fuel from biomass, instead of burning it resulting in a much cleaner burn of syngas, with dramatic reductions in $NO_X$, $SO_X$, CO, dioxins, VOCs, heavy metals, sulfur dioxide, mercury, and furans into the air that happen at temperatures higher than those typical of gasification. In fact, certain reactions are related to incineration processes, and can be better understood by comparing the chemical reactions of the two processes: combustion entails complete oxidation for heat generation and a higher concentration of pollutant gases compared to gasification where, due to the limited presence of oxygen (sub stoichiometric ratio), combustion is limited to raising temperatures required to start chemical reactions for syngas generation.

However, conventional MSW gasification requires significant throughput of MSW, a significant amount of energy, and still results in ash or other waste that must be landfilled. These attributes can make gasification impractical for many municipalities. For instance, the majority of municipalities in the United States have a population of less than ten thousand, and even more municipalities have populations of less than one hundred thousand people. Accordingly, conventional, large MSW throughput gasification systems are not practical for the majority of municipalities in the United States because the municipalities do not generate enough MSW to offset the cost of running the gasification systems and to deal with the byproducts produced by large-scale MSW gasification units. However, the systems and processes disclosed herein provide for MSW gasification with low energy requirements, low MSW throughputs, and with higher customization and transportability.

Solid waste as defined here refers to items such as wood waste, scrap carpet, nonrecyclable plastics, metals, and paper to, and including, MSW and will be referred to as either "solid waste" or "MSW."

Systems and processes according to embodiments disclosed and described herein provide MSW processing based on rotary kiln gasification technology, where the gasification unit receives unprepared MSW and converts the organic components to a usable synthetic fuel (such as syngas), with the inorganic portion reduced to two products in the form of metal, glass, and other mineral products. Using the systems and processes according to embodiments disclosed and described herein, virtually zero material is discharged to a landfill.

Referring now to FIG. 1, a system for gasification of MSW 100 is provided. The system for gasification of MSW 100 according to embodiments disclosed and described herein comprises two components, a segmented gasifier 110 and a burner 120. According to one or more embodiments, the segmented gasifier 110 is a rotary kiln gasifier. In embodiments, MSW 130 is fed into the segmented gasifier 110, and as the MSW 130 traverses from a first end of the segmented gasifier 110a to a second end of the segmented gasifier 110b, the MSW 130 is gasified and converted into separable, solid output 111 and gaseous output 112. The separable solid output 111 is collected, recycled, and/or reused for other purposes, and the gaseous output 112 is sent to the burner 120.

It should be understood that according to embodiments, additional elements may be present upstream and/or downstream of the segmented gasifier 110 and the burner 120. For instance, according to embodiments, MSW 130 may be processed prior to entering the segmented gasifier 110. Examples of this processing may be shredding, milling, mixing, and the like. However, in embodiments, the MSW 130 is not separated (e.g., carbonaceous materials, plastic materials, metals, and the like are not separated) before the MSW 130 enters the segmented gasifier 110. In addition, in one or more embodiments, an energy source 140 is introduced into the gasifier 100 near the second end 110b of the segmented gasifier 110. This energy source 140 is not particularly limited and can, in embodiments, be a combustible gas, such as methane, propane, syngas, and the like. The energy source 140 can, in embodiments, be output recycled from an alternative processing facility. In particular, syngas is a common processing facility output that can be recycled by using as energy source 140. However, in embodiments, the energy source 140 is supplied natural gas or propane from any natural gas or propane source, such as, for example, natural gas or propane from a utility or natural gas or propane stored in one or more tanks. As will be disclosed in more detail below, the energy source 140 begin with a feed of externally supplied gas, but as the gasification process proceeds, the energy source 140 may be converted to be a recycle stream of the gasification process.

The MSW 130 that may be processed according to embodiments disclosed and described herein is not limited, and multiple materials may be present in the MSW. For example, the MSW can, according to embodiments, include one or more of the following materials: T&R mix, recyclables (such as, for example, aluminum, plastics, glass, metals), wet yard waste, dry yard waste, liquids, sludges, and rubberized products (such as, for example, tires). According to embodiments, such as those shown in FIG. 1, the various materials that constitute the MSW are fed into the segmented gasifier 110 without being separated. However, according to one or more embodiments, the various materials that comprise the MSW 130 may be separated prior to being fed into the segmented gasifier 110.

Figure 2:
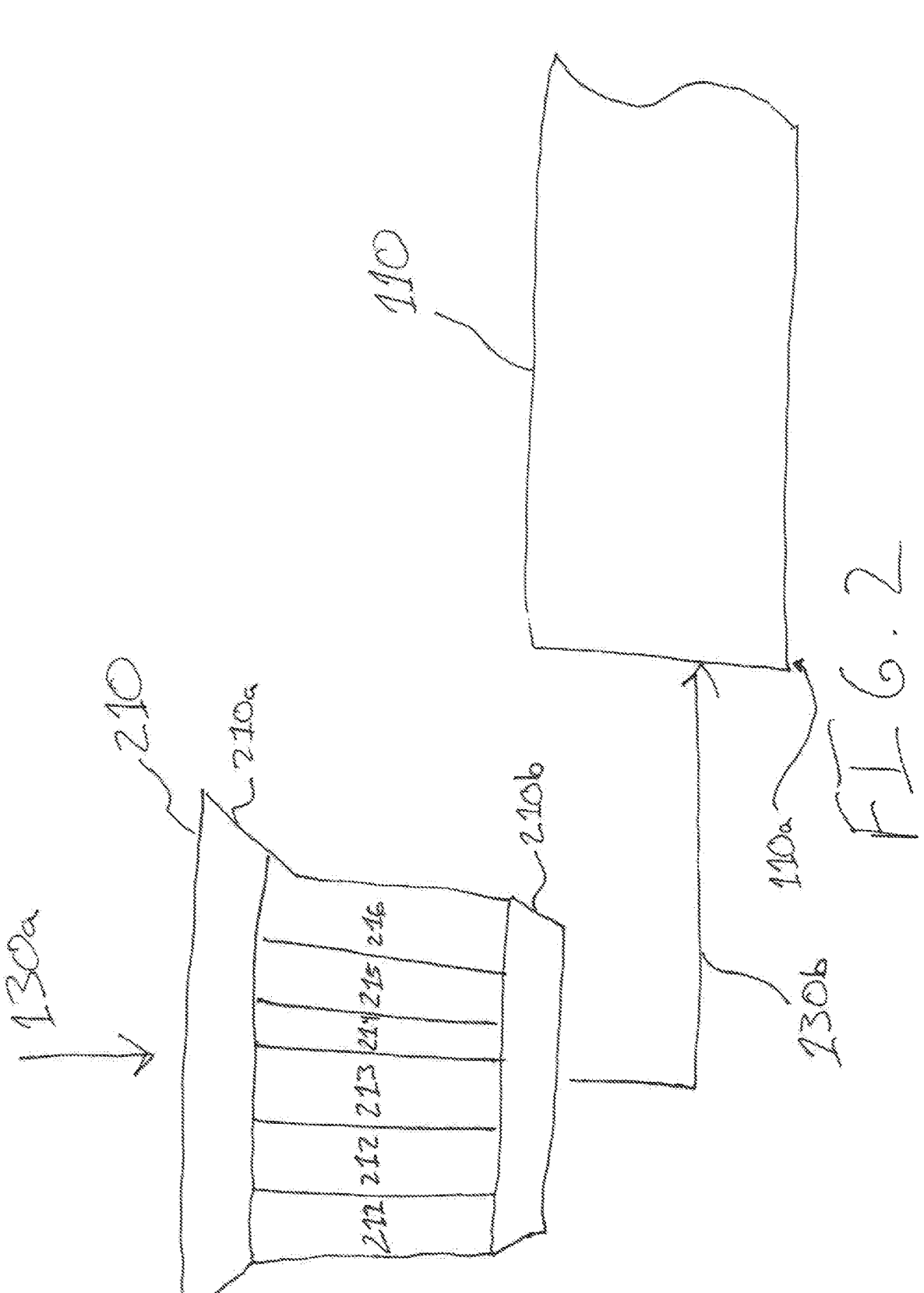
FIG. 2 is a schematic drawing of a system for separating waste materials prior to loading the waste materials into a gasifier according to embodiments disclosed and described herein.

For instance, and with reference to FIG. 2, in embodiments, MSW 130a comprising, for example, T&R mix, recyclables, wet yard waste, dry yard waste, liquids, sludges, and rubberized products may be fed into a first end 210a of a separator 210 that is upstream from the segmented gasifier 110 and separates each of the T&R mix, recyclables, wet yard waste, dry yard waste, liquids, sludges, and rubberized products into individual chambers 211, 212, 213, 214, 215, 216, such that each of the individual chambers 211, 212, 213, 214, 215, 216 comprises one type of material (e.g., one of T&R mix, recyclables, wet yard waste, dry yard waste, liquids, sludges, and rubberized products). From the chambers 211, 212, 213, 214, 215, 216 each of the materials making up the MSW 130a may be dosed to a mixer 210b that mixes the various materials into a dosed MSW feed 130b. The separator 210 is, in embodiments, coupled to the segmented gasifier 110 such as through a conduit or conveyor or the like. In some embodiments, the mixer 210b is coupled to the segmented gasifier 110. In this way, the material make-up of the dosed MSW feed 130b going into the segmented gasifier 110 may be controlled. For instance, if too great a ratio of rubberized products are entering the separator 210 more rubberized products may be held in one of the chambers 211, 212, 213, 214, 215, 216 and less rubberized product can be dosed to the mixer 210b such that a desired ratio of rubberized products is present in dosed MSW feed 130b. Similarly, if too little of a ratio of dry yard waste is fed into the separator 210, more dry yard waste can be dosed from one of the chambers 211, 212, 213, 214, 215, 216 into the mixer 210b such that a desired ratio of dry yard waste is present in dosed MSW feed 130b. It should be understood that the dosing of various materials from the chambers 211, 212, 213, 214, 215, 216 of the separator 210 to the mixer 210b may be conducted by any suitable method included mechanical methods and electronic programmable logic.

With reference again to FIG. 1, MSW 130 is fed to the segmented gasifier 110. As discussed above, the MSW 130 may be separated before being fed to the segmented gasifier 110 (such as depicted in the embodiment shown in FIG. 2), or, in other embodiments, the MSW 130 is not separated before being fed to the segmented gasifier 110. In addition to being separated, in embodiments, the MSW is dried prior to being fed to the segmented gasifier 110. Regardless of the treatments conducted beforehand, MSW 130 is fed into the first end 110*a* of the segmented gasifier 110 and is gasified as it traverses from the first end 110*a* to the second end 110*b* of the segmented gasifier 110. As mentioned previously herein, according to embodiments, the gasifier is a rotary kiln gasifier, which will be described in further detail below.

The general operation and structure of rotary kilns are known. In summary, a rotary kiln is a cylindrical vessel, inclined slightly to the horizontal, and the cylindrical vessel is rotated slowly about its longitudinal axis. For instance, and with reference again to FIG. 1, the segmented gasifier 110 may be a cylindrical vessel where the first end 110*a* of the segmented gasifier 110 is inclined from the horizontal compared to the second end 110*b* of the segmented gasifier 110. As the cylindrical vessel rotates, MSW gradually moves down from the first end 110*a* toward the lower, second end 110*b*, and may undergo a certain amount of stirring and mixing as the cylindrical vessel rotates. During this process, hot gases pass along the gasifier. In embodiments, these hot gases flow in the same direction as the MSW. In other embodiments, these hot gases flow in the opposite direction of the MSW. The hot gases may be generated in an external furnace, or may be generated by a flame inside the kiln. Such a flame is projected from a burner-pipe that acts like a large bunsen burner.

According to embodiments, the rotary kiln gasifier comprises a shell, refractory lining, support tyres and rollers, drive gear, and internal heat exchangers. In embodiments, the shell may be made from rolled steel plate welded to form a cylinder. The diameter of the shell may, according to embodiments, be set by the tendency of the shell to deform under its own weight, with consequent flexure during rotation. According to embodiments, the refractory lining insulates the steel shell from the high temperatures inside the kiln, and protects the shell from corrosive properties of the process material. The refractory may consist of refractory bricks or cast refractory concrete, and the refractory may be absent in zones of the kiln where the temperature within the kiln is expected to be low, such as, for example, below 250° C. The refractory that is selected will depend upon the expected temperature inside the gasifier and the chemical nature of the MSW being processed. According to embodiments, the tyres comprise a single annular steel casting, which is machined to a smooth cylindrical surface, that attaches loosely to the shell. The tyre rides on pairs of steel rollers, also machined to a smooth cylindrical surface, and set about half a kiln-diameter apart. The rollers must support the kiln, and allow rotation that is as nearly frictionless as possible. The rotary kiln is, according to embodiments, turned by means of a girth gear surrounding a part of the kiln tube. The gear may be connected through a gear train to a variable-speed motor that has high enough torque to start the kiln with a large eccentric load. It should be understood that the speed of MSW flow through the rotary kiln is proportional to rotation speed, and so a variable speed drive may be used to control the rotation speed and, in turn, the speed of MSW flow through the rotary kiln. Heat exchange in a rotary kiln may be by conduction, convection, radiation, or a combination thereof. According to embodiments, the rotary kiln may be furnished with internal heat exchangers to encourage heat exchange between the gas and the feed.

However, conventional gasifiers, including rotary kiln gasifiers, are very large and are constructed to handle a very high throughput of material. This leads to conventional gasifiers that are very large and require significant amounts of outside energy (such as natural gas, propane, or other sources of fuel) and air flow to maintain temperatures within the gasifier. Thus, in conventional gasifiers, it is difficult to control the temperature across the gasifier, which leads to temperature variations that can damage the refractory causing failure in the gasifier. In addition, the larger-sized gasifiers require more maintenance, have longer start-up and shut-down times, and require high material throughput, which may not be possible for smaller municipalities.

Gasifiers, such as rotary kiln gasifiers, according to embodiments disclosed and described herein address the above an other issues of conventional gasifiers by providing a smaller, modular, adaptable design that allows for better temperature control across the gasifier, allows for faster start-up and shut-down times, and allows for greater design control. As used here, the gasifier is defined as a "pyroprocessing" device that is used to raise the solid waste materials to be processed at a high temperature in a specific air-controlled environment to cause these materials to separate into a combustible gas and a non-combustible product.

As an example, conventional kilns for the gasification of MSW into useful byproducts have been developed for of 500 ton/day waste input. In contrast, the gasifier according to embodiments disclosed and described herein can be designed to process from 5 to 150 tons/day MSW, such as from 50 to 150 tons/day MSW, such as from 75 to 150 tons/day of MSW, from 100 to 150 tons/day of MSW, from 125 to 150 tons/day of MSW, 50 to 125 tons/day MSW, from 75 to 125 tons/day of MSW, from 100 to 125 tons/day of MSW, 50 to 100 tons/day MSW, from 75 to 100 tons/day of MSW, or 50 to 75 tons/day MSW. These throughputs of MSW present different technical and economic challenges than the conventional, larger scale gasifiers, such as controlling the cost of such a gasifier to make the total system affordable for small-scale applications, as well as being energy self-sufficient after start-up. The design and construction of gasifiers according to embodiments disclosed and described herein are significantly difference than conventional, large-scale gasifiers. It should be understood that while the gasifier according to embodiments disclosed and described herein is suitable for lower flow rates as disclosed above, gasifiers according to embodiments may be upscaled to process significantly more MSW, such as throughputs as high as 2,000 tons/day MSW.

According to embodiments, the gasifier is designed to be scalable by designing smaller segments of the gasifier that can be combined to form a customized gasifier. As depicted in the embodiment shown in FIG. 1, the segmented gasifier 110 comprises three segments 110*c*, 110*d*, and 110*e*. It should be appreciated that in embodiments the gasifier can comprise more or less than three segments and that each segments can be of the same or different length than any other segment. In embodiments, the segmented gasifier comprises at least 2 segments, such as 3 segments, 4 segments, 5 segments, 6 segments, 7 segments, 8 segments, 9 segments, or 10 segments. While conventional gasifiers are generally about 15 to about 20 feet in diameter and about 150 to about 200 feet long, a segment of the gasifier according to embodiments is from 3 feet to 8 feet in diameter, such as from 4 feet to 8 feet in diameter, from 5 feet to 8 feet in diameter, from 6 feet to 8 feet in diameter, from 7 feet to 8 feet in diameter, from 3 feet to 7 feet in diameter, such as from 4 feet to 7 feet in diameter, from 5 feet to 7 feet in diameter, from 6 feet to 7 feet in diameter, from 3 feet to 6 feet in diameter, such as from 4 feet to 6 feet in diameter, from 5 feet to 6 feet in diameter, from 3 feet to 5 feet in diameter, such as from 4 feet to 5 feet in diameter, or from 3 feet to 4 feet in diameter. According to one or more embodiments, a segment of the gasifier is from 10 feet to 16 feet long, such as from 11 feet to 16 feet long, from 12 feet to 16 feet long, from 13 feet to 16 feet long, from 14 feet to 16 feet long, from 15 feet to 16 feet long, from 10 feet to 15 feet long, such as from 11 feet to 15 feet long, from 12 feet to 15 feet long, from 13 feet to 15 feet long, from 14 feet to 15 feet long, from 10 feet to 14 feet long, such as from 11 feet to 14 feet long, from 12 feet to 14 feet long, from 13 feet to 14 feet long, from 10 feet to 13 feet long, such as from 11 feet to 13 feet long, from 12 feet to 13 feet long, from 10 feet to 12 feet long, such as from 11 feet to 12 feet long, or from 10 feet to 11 feet long. It should be understood that any of the above segment diameters may be combined with any of the above segment lengths, without limitation. However, in embodiments, a segment of the gasifier has a diameter from 4 feet to 6 feet and a length from 12 feet to 14 feet.

In embodiments, each segment of the gasifier is flanged on each end and the internal refractory lining poured and cured in a factory setting. This allows each segment of the segmented gasifier to be shipped separately to the site where it will be detachably connected with other segments to make a customized gasifier designed for the MSW throughput of a given municipality. Each segment is distinct and physically separable from one another. Referring again to FIG. 1, a first segment 110c of the segmented gasifier 110 may be detachably connected to a second segment 110d of the segmented gasifier 110, and the second segment 110d of the segmented gasifier 110 may be detachably connected to a third segment 110e of the segmented gasifier 110. Each of the first, second, and third segments 110c, 110d, and 110e, is physically distinct and can be separated from the other segments 110c, 110d, and 110e of the segmented gasifier. For instance, in embodiments, segments of the gasifier may be combined to form a gasifier that is from 4 feet to 6 feet in diameter and from 36 feet to 42 feet in length. However, there is no limitation on the design of the gasifier when the segments of the gasifier are combined.

Gasifiers according to embodiments disclosed and described herein are divided into segments to efficiently meet the needs of different waste supplies, but the segments also allow the gasifier itself to be designed so that maintenance costs can be reduced. For instance, if the refractory in a segment is damaged, the system may be shut down temporarily while the segment is removed and a new segment is installed. Then, the system may be restarted and operating while the damaged refractory in the replaced segment is fixed. This minimizes down time and costs associated with the maintenance of the system.

As discussed above, gasifier segments according to embodiments disclosed and described herein have smaller diameters that not only provide improved transportability and design freedom of the gasifier, but also improve the operation of the gasifier. The small diameter of the gasifier allows the waste material to tumble efficiently and constantly expose new waste to the higher temperatures that cause thermal decomposition of the waste. In this way, the gasifiers disclosed and described herein are more efficient than large, conventional kilns that require inner rakes or baffles to effectuate this type of tumbling, but these rakes and baffles can become less and less effective during the course of operation and can become damaged resulting in ineffective tumbling.

As disclosed herein above, and with reference again to FIG. 1, solid output 111 is removed from the segmented gasifier 110 and can be recycled and/or reused. Examples of the solid output include sterile metals (such as aluminum, steel, stainless steel, iron, and the like), sterile glass, carbon black (which can be used as pigment in inks, toners, and paints), fly ash (which can be used in soils, asphalts, and geopolymers), biochar (which can be used in the soil and for carbon sequestration), and char or coke (which can be used as a fuel source). These components of the solid output 111 can be collected, separated by any number of conventional methods, and reused in various processes or products. According to embodiments, all or nearly all of the solid output 111 can be reused resulting in little to no solid waste from the gasification process entering a landfill.

The gaseous output 112 from the segmented gasifier 110 may be sent to a burner 120. Although the gaseous output 112 may contain any number of components, according to embodiments, the gaseous output comprises syngas, which is a mixture of hydrogen, carbon monoxide, and small amounts of carbon dioxide. In one or more embodiments, the syngas of the gaseous output 112 is combusted in the burner 120 and the heat from the combustion can be used in any suitable way. For instance, the heat may be used in conjunction with a boiler to create steam to power an electrical generator. It should be understood that the heat may be used in conjunction with a heat exchanger as a heat source for any suitable process. According to one or more embodiments, a portion of the gaseous output 112 or heat generated by combusting the gaseous output 112 may be recycled back to various portions of the segmented gasifier 110 to maintain a consistent temperature within the segmented gasifier 110, which will be discussed in more detail below. According to embodiments, the gaseous output 112, which may comprise syngas, produced by the segmented gasifier 110 may be very hot, having a temperature in excess of 1,200° F. Accordingly, the gaseous output 112 may be a difficult gas to combust compared to traditional hydrocarbon-based fuel sources (such as methane, propane, and the like). However, burners are available that can combust this syngas and create high temperature flue gas (having temperatures in excess of, for example, 3,000° F.) that can be used in boilers and heat exchangers as described herein above.

Processes for converting waste materials, such as MSW 130, will now be described with reference again to the system of embodiments depicted in FIG. 1. A disclosed herein above, MSW 130 is fed to the segmented gasifier 110 at a first end 110a of the segmented gasifier 110. The MSW 130 may, in embodiments, be fed to the segmented gasifier 110 by ram loading or the like. As mentioned herein above, in embodiments the first end 110a of the segmented gasifier 110 may be elevated relative to the second end 110b of the segmented gasifier 110. According to one or more embodiments, the height of the first end 110a of the segmented gasifier 110 relative to the second end 110b of the gasifier 100 may be adjustable, such as through hydraulic or pneumatic lifting mechanisms affixed to the first end 110a of the segmented gasifier 110. In such embodiments, the height of the first end 110a of the segmented gasifier 110 relative to the second end 110b of the gasifier may be adjusted in process to alter the flow rate of the MSW 130 from the first end 110a of the gasifier to the second end 110b of the gasifier. As should the understood, the greater the height difference between the first end 110a of the segmented gasifier 110 and the second end 110b of the gasifier, the higher the flow rate of MSW 130 through the segmented gasifier 110 will be. An operator or programmable logic can then adjust the height difference between the first end 110a of the segmented gasifier 110 and the second end 110b of the gasifier to control the flow rate of MSW 130 through the segmented gasifier 110. The flow rate of MSW 130 through the segmented gasifier 110 may also be adjusted by increasing the rate at which the segmented gasifier 110 spins along its longitudinal axis. The more quickly the segmented gasifier 110 spins along its longitudinal axis, the higher the flow rate of MSW 130 through the segmented gasifier 110. The rate at which the segmented gasifier 110 spins along its longitudinal axis may be controlled by known methods, such as with an electric or gas motor. This control may be automated through programmable logic or the like. By controlling the height difference between the first end 110a of the segmented gasifier 110 and the second end 110b of the segmented gasifier 110 and the rate at which the segmented gasifier 110 spins along its longitudinal axis, the flow rate of MSW 130 through the segmented gasifier 110 can be controlled to react to different compositions of waste, such as waste having different heat and moisture contents.

As MSW 130 is initially loaded into the segmented gasifier 110, an energy source 140 is provided to the segmented gasifier 110 to start the pyroprocessing. The energy source 140 is a combustible gas that is introduced at the second end 110b of the segmented gasifier 110 and is combusted within the segmented gasifier 110 or just prior to entry into the segmented gasifier 110 via a burner (not shown). The combustion of the energy source 140 heats the MSW 130 that enters the segmented gasifier 110 so that it may be pyroprocessed. At the beginning of the pyroprocessing, volatile compounds are vaporized thereby drying the MSW 130 and forming gases that will aid in the combustion of less volatile compounds. The combustion of the less volatile compounds provide the energy for the gasification of MSW 130 via endothermic reactions with oxygen and hydrogen.

During the pyroprocessing, the access of air or pure oxygen into the segmented gasifier 110 is limited so that there is enough oxygen within the segmented gasifier 110 to drive the pyroprocessing and combust undesirable components. Additionally, air or pure oxygen may be introduced into the segmented gasifier 110 to combust the energy source that heats the segmented gasifier 110 to a desired temperature. However, the flow or air into the gasifier is controlled so that the amount of oxygen is not in excess so that a significant amount of oxygen is present in the gaseous outlet 112—leading to a more pure syngas product in the gaseous outlet 112. Moreover, allowing too much combustion (such as by having excess oxygen present in the gasifier) can lead to elevated temperatures of the gaseous outlet 112, which can make components of the gaseous outlet 112 more difficult to process and recycle. This pyroprocessing separates organics and other volatile components from inorganic materials, which are sterilized during the pyroprocessing. Through this process, the segmented gasifier 110 dries and processes the MSW 130 by combusting or gasifying waste while producing the gaseous output 112 and solid output 111 described herein above.

Initially, the energy source 140 is supplied by an external combustible gas 140a, such as natural gas, propane, syngas, or the like. However, as pyroprocessing continues a gaseous outlet 112 comprising syngas is generated, and at least a portion of the syngas 140b from the gaseous outlet 112 is recycled back to the segmented gasifier 110 as the energy source 140. Any syngas or other portions of the gaseous outlet 112 not recycled back to the segmented gasifier 110 may be transported to other operations that can use the syngas or other components of the gaseous outlet 112 as a fuel source. Once the portion of syngas 140b from the gaseous outlet 112 is sufficient to supply enough energy to the gasifier, the flow of external combustible gas 140a is discontinued by closing valve 150. In this way, once the pyroprocessing proceeds and gaseous outlet 112 is produced, the segmented gasifier 110 operates in a self-sufficient way by not requiring any external energy to regulate the temperature within the gasifier.

Although not explicitly depicted in FIG. 1, if the gaseous output 112 contains impurities that cannot be returned to gasifier as syngas 140b, the entirety of the gaseous output 112 may be fed to burner 120, where the impurities may be combusted and more pure syngas is formed. A portion of this more pure syngas may then be recycled from the burner 120 back to the segmented gasifier 110 as syngas 140b.

The energy source 140 that is introduced into the segmented gasifier 110 can be used to maintain a relatively constant temperature within the segmented gasifier 110. For instance, as the pyroprocessing proceeds, if the temperature within the segmented gasifier 110 decreases more heat may be introduced into the segmented gasifier 110 via energy source 140. However, if the temperature within the segmented gasifier 110 increases too much during the pyroprocessing, less heat may be introduced into the segmented gasifier 110 by reducing the flow of the energy source 140. The systems disclosed and described herein can maintain a consistent and relatively uniform temperature within the segmented gasifier 110 throughout pyroprocessing by keeping the burner connected to the energy source 140 runner during operation. This is possible by converting the energy source 140 from an external combustible gas 140a to syngas 140b produced within the segmented gasifier 110. This allows for complete gasification of the MSW 130 and destruction of pollutants. The flow rate and combustion of the energy source 140 may, according to embodiments, be automated by known methods to actively regulate the temperature within the segmented gasifier 110. By consistently controlling the temperature within the segmented gasifier 110 during pyroprocessing, nearly complete gasification of MSW 130 and combustion of pollutants may be achieved, which allows for an efficient and environmentally friendly system that does not produce significant amounts of waste to be handled after the gasification process.

This method of operation is different from traditional gasification systems. The traditional gasification systems use an external fuel source, such as natural gas or propane, to start the process; however, once the waste ignites, conventional systems turn off the external fuel source, which allows the temperature within the gasifier to fluctuate depending on the type and content of the waste material that is introduced into the gasifier. These temperature variations lead to incomplete combustion of the waste materials and pollutants that will need to be addressed in separate operations, such as incineration after the gasification process. The temperature fluctuations can also lead to damage, such as cracking, of the refractory.

An advantage of the systems disclosed and described herein as opposed to conventional systems is the tight temperature control that is maintained within the segmented gasifier 110. As disclosed herein above, providing a consistent energy source 140 to the segmented gasifier 110 can provide this temperature control. Additionally, the relative small size of the segmented gasifier 110 compared to conventional gasifiers can also aid in the temperature control. The average temperature within the segmented gasifier 110 is high enough to volatilize heavier organic compounds, but not so high as to damage the inorganics that are to be recycled, such as aluminum. According to embodiments, the average temperature within the gasifier is between 1,000° F. and 2,200° F., such as between 1,000° F. and 2,100° F., between 1,000° F. and 2,000° F., between 1,000° F. and 1,900° F., between 1,000° F. and 1,800° F., between 1,000°

F. and 1,700° F., between 1,000° F. and 1,600° F., between 1,000° F. and 1,500° F., between 1,000° F. and 1,400° F., between 1,000° F. and 1,300° F., between 1,000° F. and 1,200° F., between 1,000° F. and 1,100° F., between 1,100° F. and 2,200° F., such as between 1,100° F. and 2,100° F., between 1,100° F. and 2,000° F., between 1,100° F. and 1,900° F., between 1,100° F. and 1,800° F., between 1,100° F. and 1,700° F., between 1,100° F. and 1,600° F., between 1,100° F. and 1,500° F., between 1,100° F. and 1,400° F., between 1,100° F. and 1,300° F., between 1,100° F. and 1,200° F., between 1,200° F. and 2,200° F., such as between 1,200° F. and 2,100° F., between 1,200° F. and 2,000° F., between 1,200° F. and 1,900° F., between 1,200° F. and 1,800° F., between 1,200° F. and 1,700° F., between 1,200° F. and 1,600° F., between 1,200° F. and 1,500° F., between 1,200° F. and 1,400° F., between 1,200° F. and 1,300° F., between 1,300° F. and 2,200° F., such as between 1,300° F. and 2,100° F., between 1,300° F. and 2,000° F., between 1,300° F. and 1,900° F., between 1,300° F. and 1,800° F., between 1,300° F. and 1,700° F., between 1,300° F. and 1,600° F., between 1,300° F. and 1,500° F., between 1,300° F. and 1,400° F., between 1,600° F. and 2,200° F., such as between 1,600° F. and 2,100° F., between 1,600° F. and 2,000° F., between 1,600° F. and 1,900° F., between 1,600° F. and 1,800° F., between 1,600° F. and 1,700° F., between 1,700° F. and 2,200° F., such as between 1,700° F. and 2,100° F., between 1,700° F. and 2,000° F., between 1,700° F. and 1,900° F., between 1,700° F. and 1,800° F., between 1,800° F. and 2,200° F., such as between 1,800° F. and 2,100° F., between 1,800° F. and 2,000° F., between 1,800° F. and 1,900° F., between 1,900° F. and 2,200° F., such as between 1,900° F. and 2,100° F., between 1,900° F. and 2,000° F., between 2,000° F. and 2,200° F., such as between 2,000° F. and 2,100° F., between 2,000° F. and 2,200° F., such as between 2,000° F. and 2,100° F., or between 2,100° F. and 2,200° F. It should be understood that each of the above ranges includes the endpoints recited therein. The above temperature ranges are exemplary, and the operation of the segmented gasifier 110 is not limited to such temperatures. The actual temperature within the segmented gasifier 110 may be modified depending upon the content of the MSW 130 being introduced into the segmented gasifier 110. As disclosed herein above, an energy source 140 may be combusted to maintain a consistent temperature within the segmented gasifier 110. The combustion of the energy source 140 may be automated through known mechanisms based upon the composition of the energy source 140 and the flow rate of the MSW 130 through the gasifier 130, which may be controlled as described herein above.

Once the MSW 130 reaches the second end 110*b* of the segmented gasifier 110, it has been thoroughly dried and the organics have been vaporized and sent either to the burner 120 or recycled back into the segmented gasifier 110 as energy source 140. As disclosed herein above, the heat generated by the burner from combusting the gaseous outlet 112 can be used to generate electricity (such as via a boiler and/or heat exchanger) or used to run generators or engines (such as diesel or gas engines). Any off gas may be sent to a baghouse to remove particulate or spray absorbers. Accordingly, the organics in the MSW 130 are efficiently converted into combustible gases. At the same time, inorganics in the MSW 130 will not be damaged by the pyroprocessing and may be collected as from the solid output 111. Other materials in the solid output 111 are fine mineral residues that contain very low (i.e., less than 5 wt. %) carbon and can be used as fillers in materials like concrete and asphalt. In this way, little to no waste is sent to the landfill from the process, and energy, such as steam and electricity, may be generated from treating the MSW 130.

Part of the MSW 130 may be plastic. Plastics usually melt before they can be gasified and/or burnt off. This causes problems with mass incinerators as well as in conventional gasifiers. However, according to embodiments, granite rock may be introduced into the segmented gasifier 110 with the MSW 130 so that the plastics will melt to the surface of the granite rock where they can be gasified. In addition, scrapers and scrubbers may be used to remove any melted plastics from the walls of the segmented gasifier 110. In this way, nearly 100% of plastics can be gasified by the systems disclosed and described herein. Because the granite rocks are inert, they will exit the segmented gasifier 110 via the solid output 111, where they can be separated from the other components of the solid output 111 and recycled back into the inlet of the segmented gasifier 110 with MSW 130.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A process for treating solid waste comprising:
separating the solid waste by type and dosing all of the separated solid waste according to a type of solid waste into a first end of a segmented gasifier, such that a ratio of each type of solid waste being introduced into the first end of the segmented gasifier is controlled, wherein the first end of the segmented gasifier comprises a first segment detachably connected to a second segment;
gasifying the solid waste as it traverses from the first end of the gasifier to a second end of the segmented gasifier;
producing a gaseous output and a solid output at the second end of the segmented gasifier,
separating the gaseous output and the solid output; and
introducing a portion of the gaseous output to a burner and recycling a portion of the gaseous output to the segmented gasifier as an energy source, wherein
the solid waste is municipal solid waste that comprises more than one of recyclables, wet yard waste, dry yard waste, liquids, sludges, and rubberized products, and
the type by which the solid waste is separated includes the recyclables, wet yard waste, dry yard waste, liquids, sludges, and rubberized products.

2. The process according to claim 1, wherein the portion of the gaseous output recycled to the segmented gasifier is combusted to provide heat to drive the gasifying of the solid waste.

3. The process according to claim 1, wherein the solid waste comprises wood waste, scrap carpet, plastics, paper, municipal solid waste, and combinations thereof.

4. The process according to claim 1, wherein the gaseous output comprises syngas, and at least a portion of the syngas is recycled to the segmented gasifier.

5. The process according to claim 1, wherein an amount of solid waste processed is from 5 tons/day to 150 tons/day.

6. The process according to claim 1, wherein an amount of solid waste processed is from 50 tons/day to 75 tons/day.

7. The process according to claim 1, wherein a temperature within the gasifier is between 1,000° F. and 2,200° F.

8. The process according to claim 1, wherein granite rock is introduced into the segmented gasifier with the solid waste.

9. The process according to claim 1, the portion of the gaseous output introduced into the burner is combusted to form energy.

10. The process according to claim 1, wherein the type by which the solid waste is separated includes aluminum, plastics, glass, metals, wet yard waste, dry yard waste, liquids, sludges, and rubberized products.

11. The process according to claim 1, wherein the first segment and the second segment each individually have a length from 10 feet to 16 feet.

12. The process according to claim 11, wherein the first segment and the second segment each individually have a diameter from 3 feet to 8 feet.

13. The process according to claim 4, wherein after start-up, the segmented gasifier operates in a self-sufficient way by not requiring any external energy to regulate the temperature within the gasifier.

14. The process according to claim 1, wherein the temperature within the segmented gasifier is consistent.

15. The process according to claim 1, wherein, after the solid waste is separated by type:

each type of the solid waste is delivered to a chamber corresponding to the type of solid waste, each type of solid waste is dosed from a corresponding chamber into a mixer; and the mixer mixes the dosed solid waste and introduces mixed solid waste into the segmented gasifier.

* * * * *